United States Patent
Chalbos et al.

(10) Patent No.: US 10,454,730 B2
(45) Date of Patent: Oct. 22, 2019

(54) METHOD AND DEVICE FOR RECEIVING A SIGNAL THE PHASE OR FREQUENCY OF WHICH IS MODULATED BY A SEQUENCE OF TWO-STATE SYMBOLS

(71) Applicant: SIGFOX, Labege (FR)

(72) Inventors: Nicolas Chalbos, Eaunes (FR); Loïc Hubert, Saint-Hilaire (FR); Christophe Fourtet, Pompignan (FR)

(73) Assignee: SIGFOX, Labege (FR)

( * ) Notice: Subject to any disclaimer, the term of this patent is extended or adjusted under 35 U.S.C. 154(b) by 0 days.

(21) Appl. No.: 15/739,717

(22) PCT Filed: Jun. 22, 2016

(86) PCT No.: PCT/EP2016/064444
§ 371 (c)(1),
(2) Date: Dec. 23, 2017

(87) PCT Pub. No.: WO2016/207230
PCT Pub. Date: Dec. 29, 2016

(65) Prior Publication Data
US 2018/0191540 A1    Jul. 5, 2018

(30) Foreign Application Priority Data

Jun. 26, 2015 (FR) .................................. 15 55943

(51) Int. Cl.
*H04L 27/233* (2006.01)
*H04L 27/156* (2006.01)
(Continued)

(52) U.S. Cl.
CPC ...... *H04L 27/2335* (2013.01); *H04L 27/1563* (2013.01); *H04L 27/20* (2013.01);
(Continued)

(58) Field of Classification Search
CPC ............. H04L 27/2035; H04L 27/0008; H04L 27/2276; H04L 5/0023; H04L 27/34;
(Continued)

(56) References Cited

U.S. PATENT DOCUMENTS

| | | | |
|---|---|---|---|
| 2008/0056419 A1* | 3/2008 | Lee .................... | H04B 1/71632 375/355 |
| 2012/0069893 A1* | 3/2012 | Shirakata ............ | H04L 25/0262 375/239 |

OTHER PUBLICATIONS

Tsai et al., "A 400Mhz 10 Mbps D-BPSK receiver with a reference-less dynamic phase-to-amplitude demodulation technique," 2014 Symposium on VLSI Circuits Digest of Technical Papers, Jun. 10, 2014, p. 1-2, IEEE.

* cited by examiner

*Primary Examiner* — David C Payne
*Assistant Examiner* — Sarah Hassan
(74) *Attorney, Agent, or Firm* — Im IP Law; C. Andrew Im; Chai Im

(57) ABSTRACT

A method allowing a receiver device of a wireless communication system to receive a useful signal emitted by an emitter device. The useful signal corresponding to a signal, the phase or frequency of which is modulated by a sequence of two-state symbols corresponding to a sequence of binary data. A temporal envelope of the useful signal is detected and compared to a preset threshold value. Transitions between consecutive useful-signal symbols are detected, on the basis of the result of the comparison. A sequence of binary data is extracted from the useful signal depending on the detected transitions.

13 Claims, 3 Drawing Sheets

(51) Int. Cl.
*H04L 27/26* (2006.01)
*H04L 27/20* (2006.01)

(52) U.S. Cl.
CPC ...... *H04L 27/2035* (2013.01); *H04L 27/2071* (2013.01); *H04L 27/2655* (2013.01)

(58) Field of Classification Search
CPC . H04L 27/2272; H04L 27/20; H04L 27/2602; H04L 27/10; H04L 27/2003; H04L 27/36
USPC .......................................... 375/219; 380/253
See application file for complete search history.

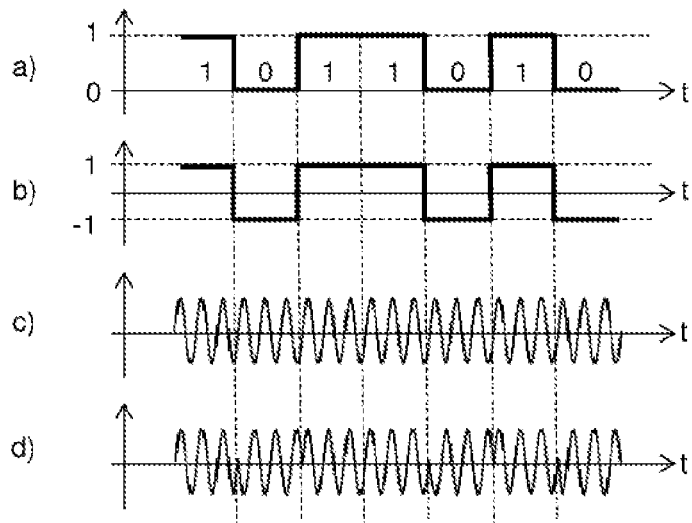
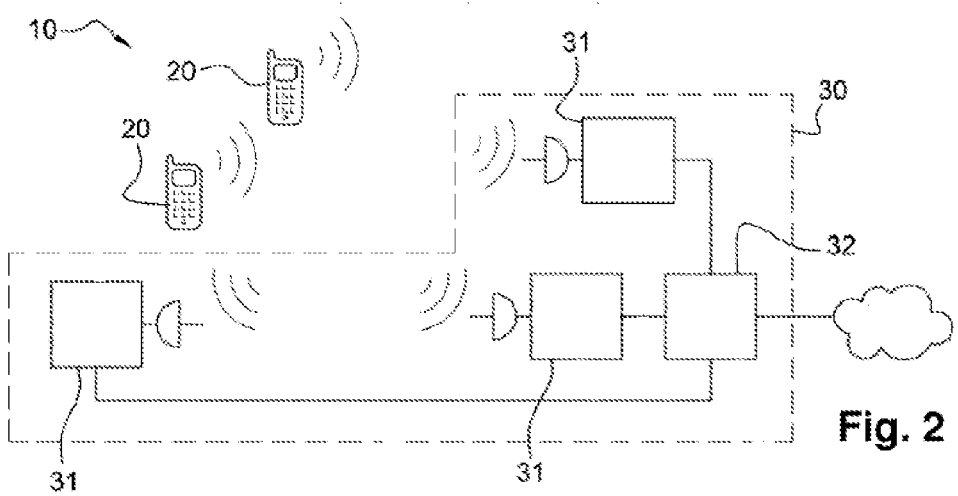
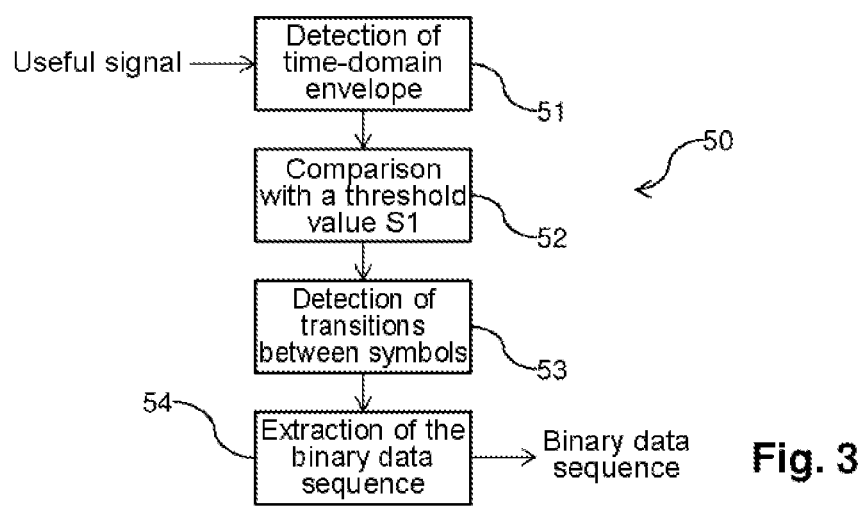

METHOD AND DEVICE FOR RECEIVING A SIGNAL THE PHASE OR FREQUENCY OF WHICH IS MODULATED BY A SEQUENCE OF TWO-STATE SYMBOLS

RELATED APPLICATIONS

This application is a § 371 application from PCT/EP2016/064444 filed Jun. 22, 2016, which claims priority from French Patent Application No. 15 55943 filed Jun. 26, 2015, each of which is incorporated herein by reference in its entirety.

TECHNICAL FIELD

The present invention belongs to the field of wireless communication systems, and more particularly relates to a method for the reception of a useful signal corresponding to a signal that is phase-modulated or frequency-modulated by a sequence of two-state symbols corresponding to a binary data sequence.

BACKGROUND OF THE INVENTION

A particularly advantageous application, although not at all limiting, of the present invention is for the reception of a BPSK (Binary Phase Shift Keying) or DBPSK (Differential BPSK) signal.

FIG. 1 schematically represents the principle for generating a BPSK signal from a binary data sequence.

As illustrated by part a) in FIG. 1, in the binary data sequence, each binary data item or "bit" can take the value 0 or 1. In the example illustrated by part a) in FIG. 1, the binary data sequence corresponds to "1 0 1 1 0 1 0".

Part c) in FIG. 1 represents a substantially sinusoidal signal, referred to as "carrier", and part d) in FIG. 1 represents the BPSK signal obtained by modulating the phase of the carrier by means of the binary data sequence illustrated by part a) in FIG. 1.

As illustrated by part d) in FIG. 1, when the bit to be transmitted is equal to 1, the BPSK signal is identical to the carrier. However, when the bit to be transmitted is equal to 0, the BPSK signal corresponds to the carrier phase-shifted by 180° ($\pi$), i.e. it corresponds to the carrier multiplied by a factor $-1$.

The BPSK signal can therefore be viewed as the product of the carrier and a sequence, illustrated by part b) in FIG. 1, of two-state symbols: a first state equal to 1 when the bit to be transmitted is equal to 1, and a second state equal to $-1$ when the bit to be transmitted is equal to 0.

To receive a BPSK signal, the received BPSK signal must be multiplied by a sinusoidal signal synchronized in frequency and in phase with the carrier of said BPSK signal. The result of this multiplication is then low-pass filtered before extracting the binary data sequence.

In the context of the "Internet of Things" (IoT), each everyday object is intended to become a communicating object, and is to that end equipped with a terminal suitable for transmitting data to an access network, generally over a radio link. The access network includes base stations which collect the data transmitted by said terminals.

In such a context, it is important to have solutions which are both low-cost (and therefore low-complexity) and at the same time low energy consumers. This means that, for example, many everyday objects can be made communicating without impacting their production cost significantly, and especially without impacting too much their autonomy when they are battery-operated. At the terminal end, the use of, for example, BPSK modulation provides for a simple and inexpensive solution to implement for the data transmission part.

Just as for any wireless communication system, it is important to have a large geographic coverage in order to be able to collect data transmitted by a maximum number of terminals. Although wireless communication systems for the IoT provide for a larger range than mobile telephony cellular wireless communication systems, the coverage in certain areas, in particular areas that are underground or inside buildings, remains a problem.

To address these gaps in coverage, it is appropriate to densify the access network by the addition of base stations referred to as "femtocells" which are intended to cover areas that are restricted in size and poorly served by the other base stations of the access network.

It is clear that such a densification approach must rely on particularly low-cost solutions without which the profitability of the rollouts would be compromised. In such a context, the use of the conventional BPSK demodulator, which needs to generate a sinusoidal signal that is synchronized in phase and in frequency with the carrier of the BPSK signal, turns out to be too complex and costly to implement.

In a wireless communication system for the IoT, the exchanges of data are mainly unidirectional, in this case over an uplink between the terminals and the access network. Such an operating mode is completely satisfactory for a number of applications, such as for example the remote reading of gas, water and electricity meters, the remote monitoring of buildings or houses, etc.

In some applications, it can be advantageous to also be able to perform data exchanges in the other direction, i.e. over a downlink from the access network to the terminals, for example to reconfigure a terminal and/or control an actuator linked to said terminal. However, such capability must be provided while limiting the impact on complexity, cost and electrical consumption of the terminals, such that use of the conventional BPSK demodulator is a priori ruled out.

A DBPSK signal demodulator is known from the scientific publication "A 400 MHz D-BPSK receiver with a reference-less dynamic phase-to-amplitude demodulation technique", written by Yi-Li Tsai et al.

In this scientific publication, the demodulator includes as input a PM/AM (Phase Modulation/Amplitude Modulation) converter which converts a phase-modulated signal PM (the DBPSK signal) into an amplitude-modulated signal AM, which is introduced in the form of a digitally controlled oscillator (DCO). After having performed this PM/AM conversion on the DBPSK signal, it is possible to implement conventional AM demodulation techniques.

However, such a demodulator for DBPSK signals also turns out to be too complex and too costly to implement in a wireless communication system for the IoT.

SUMMARY OF THE INVENTION

An object of the present invention is to remedy all or some of the limitations of the solutions of the prior art, notably those described above, by proposing a solution which provides for receiving in a simple and low-cost manner a signal that is phase-modulated or frequency-modulated by a sequence of two-state symbols, for example a BPSK or DBPSK signal.

To this end, and according to a first aspect, the invention relates to a method for the reception, by a receiver device of a wireless communication system, of a useful signal transmitted by a transmitter device, said useful signal corresponding to a signal that is phase-modulated or frequency-modulated by a sequence of two-state symbols corresponding to a binary data sequence, said reception method including:

the detection of a time-domain envelope of the useful signal, the comparison of the detected time-domain envelope with a predetermined threshold value, the detection of transitions between consecutive symbols of the useful signal: a transition between two consecutive symbols, the respective states of which are different, being detected when the detected time-domain envelope is less than the threshold value, and a transition between two consecutive symbols, the respective states of which are identical, being detected when the detected time-domain envelope is greater than said threshold value, the extraction of the binary data sequence from the useful signal as a function of the detected transitions between different states and as a function of detected transitions between identical states.

Thus, the reception method relies on the detection of a time-domain envelope of the useful signal. The detection of the time-domain envelope is known within the framework of amplitude-modulated signal reception, since in such a case the time-domain envelope is substantially proportional to the transmitted sequence of symbols.

The phase-modulated or frequency-modulated signals are in principle of constant amplitude. However, the inventors have observed that, since the symbol sequence is generally filtered upon transmission to reduce the spectral occupation of the useful signal, said transmitted useful signal exhibits a drop in amplitude during transitions between consecutive symbols that correspond to different states.

The detected time-domain envelope is therefore advantageously used, within the framework of the reception of a phase-modulated or frequency-modulated signal, to detect the transitions between different states (which results in a drop in the amplitude of the detected time-domain envelope between the corresponding two consecutive symbols) and the transitions between identical states (which results in an absence of a drop in the amplitude of the detected time-domain envelope between the corresponding two consecutive symbols). The detected transitions between different states and the detected transitions between identical states can be used, in the case of a differential modulation such as DBPSK modulation, to directly recover the transmitted binary data sequence. For the case in which the modulation used is not differential, for example in the case of a BPSK modulation, the binary data sequence can be recovered indirectly as soon as the state of at least one binary data item is known. This information can notably be obtained as soon as the transmitted binary data sequence includes a binary data pattern that is a priori known to the receiver device.

In comparison with the abovementioned scientific publication, it is noted that the time-domain envelope is detected directly on the useful signal, i.e. on the phase-modulated or frequency-modulated signal, and not on a signal obtained at the output of a PM/AM converter. Therefore, the reception method that is a subject of the present invention exhibits the advantage, in comparison with the abovementioned scientific publication, of not needing a PM/AM converter such as a digitally controlled oscillator.

In particular forms of implementation, the reception method can additionally include one or more of the following characteristics, taken in isolation or in all technically possible combinations.

In particular forms of implementation, said symbols of the sequence being transmitted at a symbol period, said reception method includes the determination of decision instants separated by the symbol period, and the transitions between consecutive symbols of the useful signal are detected as a function of said decision instants.

In particular forms of implementation, the decision instants are determined as a function of at least one instant of detection of a transition between different states.

In particular forms of implementation, the decision instants correspond to instants for which the detected time-domain envelope is greater than said threshold value, and:

a transition between different states is detected when the detected time-domain envelope becomes less than said threshold value between two consecutive decision instants, a transition between identical states is detected when the detected time-domain envelope remains greater than said threshold value between two consecutive decision instants.

In particular forms of implementation, the useful signal is an ultra-narrowband signal.

In particular forms of implementation, the useful signal is a BPSK or DBPSK signal.

In particular forms of implementation, the useful signal is a GFSK (Gaussian Frequency Shift Keying) or DGFSK (Differential GFSK) signal.

In particular forms of implementation, the means implemented to detect the time-domain envelope of the useful signal and to compare the detected time-domain envelope with the threshold value are also implemented, in the receiver device, to receive amplitude-modulated signals.

According to a second aspect, the present invention relates to a computer program product including a set of program code instructions which, when they are executed by a processor, configure said processor to implement a reception method according to any one of the forms of implementation of the invention.

According to a third aspect, the present invention relates to a receiver device of a wireless communication system, including means configured to implement a reception method according to any one of the forms of implementation of the invention.

According to a fourth aspect, the present invention relates to a method of transmission, by a transmitter device of a wireless communication system, of a useful signal to a receiver device, said useful signal corresponding to a reference signal that is on-off amplitude-modulated by a sequence of two-state symbols corresponding to a binary data sequence, said symbols of the sequence being transmitted at a symbol period. Additionally, since the receiver device is configured to detect drops in amplitude having durations of less than the symbol period, a first symbol state is encoded by a first value over the symbol period, and a second symbol state is encoded by the first value over the symbol period with the exception of a time interval, called "cancellation interval", having a duration that is shorter than the symbol period and over which the second symbol state is encoded by a second value that is different from the first value, the first value and the second value being associated with the on modulation and with the off modulation, respectively, of the reference signal.

In particular forms of implementation, the transmission method can additionally include one or more of the following characteristics, taken in isolation or in all technically possible combinations.

In particular forms of implementation, the symbol period being of duration Te, the duration of the cancellation interval is equal to or shorter than Te/2, or equal to or shorter than Te/4.

In particular forms of implementation, the cancellation interval is placed, in the second symbol state, at the start or at the end of the symbol period.

In particular forms of implementation, the cancellation interval is surrounded, in the second symbol state, by two time intervals over which said second state is encoded by the first value.

According to a fifth aspect, the present invention relates to a computer program product including a set of program code instructions which, when they are executed by a processor, configure said processor to implement a transmission method according to any one of the forms of implementation of the invention.

According to a sixth aspect, the present invention relates to a transmitter device of a wireless communication system, including means configured to implement a transmission method according to any one of the forms of implementation of the invention.

DESCRIPTION OF THE DRAWINGS

The invention will be better understood on reading the following description given by way of example that is not at all limiting, and with reference to the drawings which represent:

FIG. 1: already described, time-domain diagrams representing the principle of BPSK modulation;

FIG. 2: a schematic representation of a wireless communication system;

FIG. 3: a diagram illustrating the main steps of a method for the reception of a useful signal;

In these drawings, identical references between one drawing and another denote identical or similar elements. For reasons of clarity, the elements represented are not to scale, unless otherwise indicated.

DETAILED DESCRIPTION OF EMBODIMENTS

Figure 4:
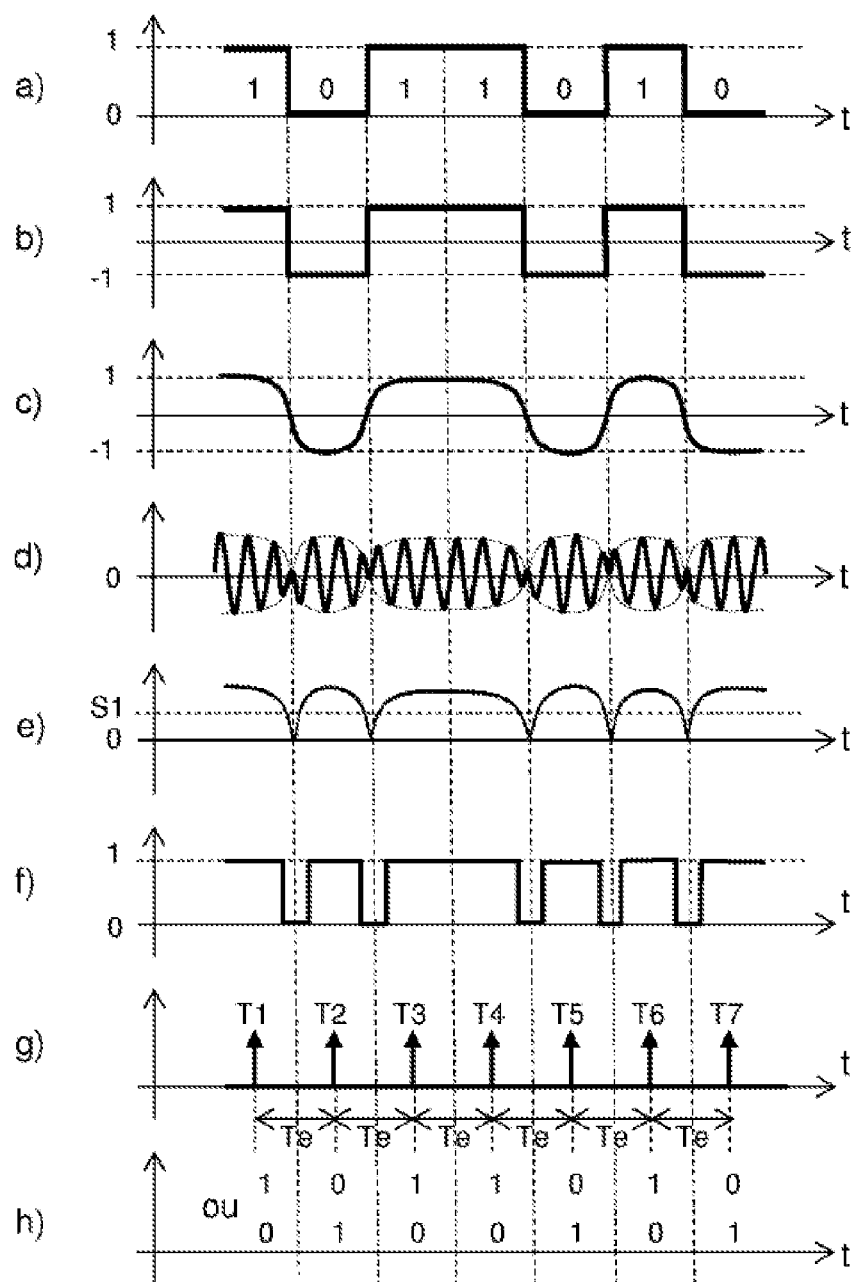
FIG. 4: time-domain diagrams representing the principle of operation of the reception method of FIG. 3, for the case in which the useful signal is a BPSK signal.

FIG. 2 schematically represents a wireless communication system 10, including several terminals 20 and an access network 30 including several base stations 31.

The terminals 20 and the base stations 31 of the access network 30 exchange useful signals in the form of radio signals. "Radio signal" is understood to mean an electromagnetic wave propagating via non-wired means, the frequencies of which are in the traditional spectrum of radio waves (a few hertz to several hundreds of gigahertz).

The wireless communication system 10 is for example ultra-narrowband. "Ultra-narrowband" (UNB) is understood to mean that the instantaneous frequency spectrum of useful signals transmitted by the terminals 20 to the access network 30 is of a frequency width of less than one kilohertz. Such UNB wireless communication systems are particularly suitable for M2M (Machine-to-Machine) or IoT applications. However there is no reason to exclude the possibility, according to other examples, of terminals 20 for which the useful signals transmitted are not ultra-narrowband signals.

The terminals 20 are suitable for transmitting useful signals over an uplink to the access network 30. Each base station 31 is suitable for receiving the useful signals from terminals 20 that are within its range. Each useful signal thus received is for example processed by the base station 31 and/or by a server 32 of the access network 30.

The wireless communication system 10 can moreover be bidirectional. If necessary, the access network 30 is suitable for transmitting, via the base stations 31, useful signals over a downlink to terminals 20 which are suitable for receiving them. The useful signals transmitted by the base stations 31 are for example ultra-narrowband signals. However there is no reason to exclude the possibility, according to other examples, of base stations 31 for which the useful signals transmitted are not ultra-narrowband signals, and this independently of the spectral width of the useful signals of the terminals 20.

The present invention relates notably to a method 50 for the reception of a useful signal corresponding to a signal that is phase-modulated or frequency-modulated by a sequence of two-state symbols corresponding to a binary data sequence.

Hereafter, the description relates in a nonlimiting manner to the case of a useful signal transmitted over the uplink such that the transmitter device for the useful signal is a terminal 20. The receiver device, which implements the reception method 50, is an item of equipment or a combination of items of equipment of the access network 30. Hereafter, the description relates in a nonlimiting manner to the case in which the various steps of the reception method 50 are all implemented by one base station 31. However there is no reason to exclude the possibility, according to other examples, that the various steps of the reception method 50 are implemented by the server 32 (which receives, if necessary, the useful signal from a base station 31), or are implemented jointly by a base station 31 and said server 32.

Each base station 31 includes for example a processing module (not represented in the drawings) containing for example one or more processors and storage means (magnetic hard disk, electronic memory, optical disc, etc) in which a computer program product is stored in the form of a set of program code instructions to be executed in order to implement the various steps of the reception method 50. In a variant, each processing module contains one or more programmable logic circuits (FPGAs, PLDs, etc), and/or one or more specialized integrated circuits (ASICs), and/or a set of discrete electronic components, etc, suitable for implementing all or some of said steps of the reception method 50.

Each base station 31 further includes wireless communication means, considered to be known to a person skilled in the art, enabling said base station to receive a useful signal transmitted by a terminal 20 in the form of a radio signal.

In other words, each base station 31 of the access network 30 includes means configured in software form (specific computer program product) and/or in hardware form (FPGAs, PLDs, ASICs, discrete electronic components, etc) in order to implement the various steps of the method 50 for the reception of a useful signal.

FIG. 3 schematically represents the main steps of the method 50 for the reception of a useful signal corresponding to a phase-modulated or frequency-modulated signal, which are:

51 detection of a time-domain envelope of the useful signal,
52 comparison of the detected time-domain envelope with a predetermined threshold value,
53 detection of transitions between consecutive symbols of the useful signal, from the result of the comparison,
54 extraction of the binary data sequence from the useful signal as a function of the transitions between detected consecutive symbols.

Thus, the reception method 50 relies on the detection of the time-domain envelope of the useful signal. Such a detection of the time-domain envelope of the useful signal can be achieved in a manner that is not very complex nor very costly, for example by means of a diode, or even by means of a super-regenerative detector, etc.

It is to be noted that the time-domain envelope detection is carried out directly on the useful signal, i.e. without performing beforehand a conversion of the phase or frequency transitions of said useful signal into amplitude variations, as is the case in the prior art. The reception method 50 can nevertheless include other steps, notably prior to the time-domain envelope detection (filtering, amplification, frequency translation, etc), which mainly aim to improve the signal-to-noise ratio of said useful signal and/or to bring it to an intermediate frequency, but which do not perform any conversion of the phase or frequency transitions of the useful signal into amplitude variations.

Preferably, the time-domain envelope detection of the useful signal is for example carried out directly at the output of a low-noise amplifier (LNA) of the base station 31 (receiver device).

Such a time-domain envelope detection, directly on the useful signal, is highly unusual in the context of the detection of a phase-modulated or frequency-modulated signal, insofar as the phase-modulated or frequency-modulated signals are in principle of constant amplitude. However, since the sequence of symbols is generally filtered upon transmission to reduce the spectral occupation of the useful signal, said useful signal generally exhibits a drop in amplitude during transitions between consecutive symbols that correspond to different states.

Therefore, it is possible to detect the transitions between consecutive symbols corresponding to different states by comparing the detected time-domain envelope with a predetermined threshold value S1. Even in this case, such a comparison can be performed in a manner that is not very complex nor very costly, for example by means of an operational-amplifier-based comparator circuit, etc.

In practice, a transition between two consecutive symbols, the respective states of which are different, is then detected when the detected time-domain envelope is less than the threshold value S1.

On the other hand, during a transition between two consecutive symbols corresponding to identical states, the detected time-domain envelope does not drop such that, during such a transition, the detected time-domain envelope is in principle greater than said threshold value S1.

To improve, the detection, it is also possible to consider other aspects, such as for example the time-domain aspect. In particular, the symbols of the sequence included in the useful signal are transmitted periodically with a predetermined symbol period Te (known a priori to the terminal 20 and/or estimated by it), so that the duration of each symbol is equal to said symbol period Te. Therefore, during a transition between different states, the detected time-domain envelope is in principle less than the threshold value S1 over a duration that is shorter than the symbol period Te. However, during a transition between identical states, the detected time-domain envelope will in principle be greater than said threshold value S1 over a duration that is longer than said symbol period Te. Therefore, in particular forms of implementation, a transition between different states can be considered to be detected only if the detected time-domain envelope is less than said threshold value S1 over a duration that is shorter than said symbol period Te and/or over a predefined minimum duration, shorter than the symbol period Te, chosen so as to limit the probability of a false detection. Furthermore, a transition between identical states can be considered to be detected only if the detected time-domain envelope is greater than said threshold value S1 over a duration that is longer than said symbol period Te.

Next, it is possible to extract the binary data sequence from the useful signal as a function of detected transitions between different states and as a function of detected transitions between identical states, and possibly as a function of additional information.

FIG. 4 schematically represents the principle of operation of the reception method 50, for the case in which the useful signal is a BPSK signal.

Part a) in FIG. 4 represents the binary data sequence transmitted by the terminal 20, which corresponds to "1 0 1 1 0 1 0".

Part b) in FIG. 4 represents the two-state symbol sequence associated with the binary data sequence represented in part a). In the example illustrated by part b), the two states correspond to the values 1 and −1 respectively over the symbol period Te, so that the sequence of symbols transmitted corresponds to "1 −1 1 1 −1 1 −1".

Part c) in FIG. 4 represents the symbol sequence obtained after shape filtering, in this case a low-pass filter. As illustrated by part c) in FIG. 4, the transitions between different states, from the value 1 to the value −1 or from the value −1 to the value 1, are smoothed by virtue of the shape filtering. Thus, the value of the symbol sequence obtained after filtering gradually reduces during a transition from the value 1 to the value −1, and gradually increases during a transition from the value −1 to the value 1, in both cases passing through zero.

Part d) in FIG. 4 represents the BPSK signal obtained by multiplying the carrier by the symbol sequence obtained after filtering. Due to the shape filtering, the amplitude of the BPSK signal tends toward zero at each transition between symbols corresponding to different states.

Part e) in FIG. 4 represents the time-domain envelope detected at the end of step 51. Due to the shape filtering, the detected time-domain envelope tends toward zero at each transition between symbols corresponding to different states. However, in the case of a transition between symbols corresponding to identical states (for example, from the value 1 to the value 1 or from the value −1 to the value −1), the detected time-domain envelope does not include any drop, and remains substantially equal to the amplitude of the BPSK signal at the middle of a symbol.

Therefore, it is understood that it is possible to detect the transitions between different states and the transitions between identical states by choosing a suitable threshold value S1, preferably close to zero. Part f) in FIG. 4 represents the signal obtained after thresholding of the detected time-domain envelope with respect to the threshold value S1.

In the example illustrated by part f) in FIG. 4, the signal obtained after thresholding takes two values, for example 0 and 1 respectively, and said signal obtained after thresholding is:

equal to 0 when the detected time-domain envelope is less than the threshold value S1, equal to 1 when the detected time-domain envelope is greater than the threshold value S1.

In order to detect the transitions between different states and the transitions between identical states, it is for example possible to consider decision instants separated by the symbol period Te. Part g) in FIG. 4 represents such decision instants T1 to T7.

In the example illustrated by part g) in FIG. 4, the decision instants T1-T7 are placed such that, at each decision instant, the detected time-domain envelope is greater than the threshold value S1, i.e. the signal obtained after thresholding is equal to 1. For example, each decision instant is placed so as to substantially be at the middle of a symbol. For such decision instants:

a transition between different states is detected when the detected time-domain envelope becomes less than said threshold value S1 between two consecutive decision instants, a transition between identical states is detected when the detected time-domain envelope remains greater than said threshold value S1 between two consecutive decision instants.

In the example illustrated by FIG. 4:

a transition between different states is thus detected between the instants T1 and T2, T2 and T3, T4 and T5, T5 and T6, T6 and T7, a transition between identical states is thus detected between the instants T3 and T4.

It is to be noted that there is no reason to exclude the possibility, according to other examples, of other ways to place the decision instants. Notably, given that the aim is to detect the types of transitions between symbols, the decision instants can be placed substantially at the transitions between symbols. In such a case, at a given decision instant, the value of the signal obtained after thresholding gives the type of transition directly:

if the signal obtained after thresholding is equal to 0, this means a transition between different states, if the signal obtained after thresholding is equal to 1, this means a transition between identical states.

As indicated previously, the decision instants T1-T7 are separated by the symbol period Te. If the symbol period Te is known a priori to the base station 31, and if it is moreover generated with sufficient precision by the terminal 20, then said symbol period Te can be generated by said base station 31 independently of the useful signal. If on the other hand said symbol period Te is not known a priori to the base station 31 and/or if the precision of generation of the symbol period by the terminal 20 and/or by the base station 31 is considered to be insufficient, then the base station 31 can estimate said symbol period Te from the useful signal. Such an estimate of the symbol period Te by the base station 31 corresponds to a time synchronization of the symbol clock of the base station 31 on the symbol clock of the terminal 20.

In preferred forms of implementation, the decision instants T1-T7 are determined as a function of all or some of the instants of detection of transitions between different states. The instant at which a transition between different states is detected corresponds to the end of one symbol and to the start of the next symbol. Thus, for the case in which the symbol period used by the base station 31, denoted by Te', is slightly different from the symbol period Te used by the terminal 20, then each instant of detection of a transition between different states can be used to align the symbol clock of said base station 31 on the symbol clock of the terminal 20. Thus, it is possible to avoid having a too significant drift over the duration of the symbol sequence. Additionally or as an alternative, two instants of detection of transitions between different states being spaced out in time by a duration $\Delta T$ which is equal to $k \cdot Te$, where k is a positive integer that is unknown a priori to the base station 31, it is possible to estimate the symbol period Te used by the terminal 20 as a function of the duration $\Delta T$. The number k can be estimated for example by seeking a positive integer m which minimizes the difference between Te' and $\Delta T/m$, the estimate of the symbol period Te used by the terminal 20 being given by $\Delta T/k$.

As illustrated by part h) in FIG. 4, the transitions between detected different states and the transitions between detected identical states cannot, when considered alone and in the case of a BPSK signal, be used to directly extract the binary data sequence "1 0 1 1 0 1 0". In the absence of additional information, it is only possible to determine that the sequence is the binary data sequence "1 0 1 1 0 1 0" or the binary data sequence "0 1 0 0 1 0 1". In other words, in the absence of additional information, there are two possible binary data sequences. However, it is possible to remove this ambiguity, notably, as soon as the binary data sequence includes a predefined binary data pattern, known a priori to the base station 31, referred to as "pilot pattern". In such a case, it is sufficient for example to look for the presence of the pilot pattern in each of the two possible binary data sequences, and the one of said two binary data sequences which includes said pilot pattern corresponds to the binary data sequence transmitted by the terminal 20. It is to be noted that other methods can be implemented to remove this ambiguity, and that the choice of one particular method is only one variant implementation of the invention.

However, for the case in which the useful signal is a differentially encoded signal, such as a DBPSK signal, the transitions between detected different states and the transitions between detected identical states can be used to directly extract the binary data sequence. In the case of a DBPSK signal, the binary data to be transmitted is encoded, in the symbol sequence, in the form of transitions between different states and in the form of transitions between identical states. For example:

a bit equal to 0 is encoded in the form of a transition between different states, i.e. in the form of a phase jump of 180° ($\pi$), a bit equal to 1 is encoded in the form of a transition between identical states, i.e. the phase of the carrier is not changed.

It is therefore understood that the transitions between detected different states and the transitions between identical states can, in the case of a DBPSK signal, be used to directly recover the binary data sequence.

It is to be noted that the means implemented, during step 51 and step 52, to detect the time-domain envelope of the useful signal and to compare the detected time-domain envelope with the threshold value S1, can also be implemented, in the base station 31, to receive amplitude-modulated signals. Such means are conventionally used for the reception of amplitude-modulated signals, in particular on-off amplitude-modulated signals ("On-Off Keying", or OOK). Therefore, the base station 31 can advantageously be configured, without increasing its complexity and cost, to receive both amplitude-modulated signals and phase-modulated or frequency-modulated signals.

However, the reception method 50 relies on the fact that a phase-modulated or frequency-modulated signal, due to the pulse-shaping filtering, exhibits a drop in amplitude during transitions between consecutive symbols that correspond to different states. However, this drop in amplitude is brief, with a duration that is shorter than the symbol period Te, or even much shorter than said symbol period Te. Step 53 of the reception method 50 moreover corresponds, in certain forms of implementation, to detecting:

- time intervals of shorter duration than the symbol period Te, over which the detected time-domain envelope is less than the threshold value S1, referred to as "low intervals",
- time intervals of longer duration than said symbol period Te, over which the detected time-domain envelope is greater than said threshold value S1, referred to as "high intervals".

The low intervals correspond, in the case of a phase-modulated or frequency-modulated signal, to transitions between different states, while the high intervals correspond to transitions between identical states.

Therefore, with a view to enabling or facilitating the reception, by the same base station 31, of amplitude-modulated signals, in particular OOK signals, it can become necessary to modify the encoding of the symbols.

To this end, the present invention relates also to an OOK signal transmission method 60 which is implemented, in the case of a transmission over the uplink, by a terminal 20.

The terminal 20 includes for example a processing module (not represented in the drawings) containing for example one or more processors and storage means (magnetic hard disk, electronic memory, optical disc, etc) in which a computer program product is stored in the form of a set of program code instructions to be executed in order to implement the various steps of the transmission method 60. In one variant, each processing module contains one or more programmable logic circuits (FPGAs, PLDs, etc), and/or one or more specialized integrated circuits (ASICs), and/or a set of discrete electronic components, etc, suitable for implementing all or some of said steps of the transmission method 60.

The terminal 20 further includes wireless communication means, considered to be known to a person skilled in the art, enabling said terminal to transmit the OOK signal in the form of a radio signal.

In other words, the terminal 20 includes means configured in software form (specific computer program product) and/or in hardware form (FPGAs, PLDs, ASICs, discrete electronic components, etc) to implement the various steps of the method 60 for the transmission of a useful signal.

Figure 5:
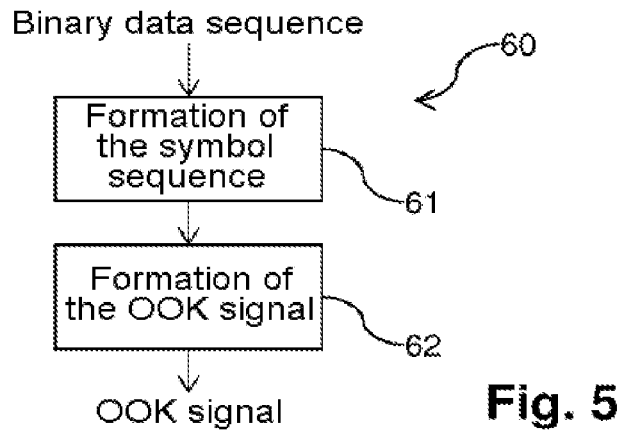
FIG. 5: a diagram representing the main steps of a method for the transmission of a useful signal.

FIG. 5 schematically represents the main steps of a method 60 for the transmission of an OOK type useful signal.

As illustrated by FIG. 5, the transmission method 60 first of all includes a step 61 for forming, from a binary data sequence, a sequence of two-state symbols. The two possible states for each symbol correspond to:

- a first state which is encoded by a first value over the whole symbol period Te,
- a second state which is encoded by said first value over the whole symbol period Te with the exception of a time interval, referred to as "cancellation interval", having a duration that is shorter than said symbol period Te and over which said second state is encoded by a second value that is different from the first value.

Then, the transmission method 60 includes a step 62 for forming the useful signal by on-off amplitude modulation of a reference signal by the symbol sequence, if necessary after shape filtering. The reference signal is for example a substantially sinusoidal signal, i.e. a carrier.

During the formation step 62, the first value is associated with the on modulation of the reference signal, i.e. the reference signal is transmitted in the OOK signal. The second value is associated with the off modulation, i.e. the reference signal is then not transmitted in the OOK signal, said OOK signal then being substantially null.

The OOK signal thus obtained is then transmitted by the terminal 20 to one or more base stations 31 of the access network 30.

Therefore, the OOK signal thus transmitted is substantially null only during the cancellation intervals, which are of shorter duration than the symbol period Te. It is therefore understood that, after envelope detection (step 51) and thresholding (step 52), such an OOK signal gives low intervals and high intervals as in the case of a useful signal that is phase-modulated or frequency-modulated. A low interval is obtained in the presence of a symbol of the second state, and a high interval is obtained in the presence of a symbol of the first state.

Preferably, the duration of the cancellation interval is equal to or shorter than Te/2, or equal to or shorter than Te/4. The duration of the detected low interval decreases with the duration of the cancellation interval, and the precision with which the symbol clock of the base station 31 can be aligned on the symbol clock of the terminal 20 improves as the duration of the detected low interval decreases.

Figure 6:
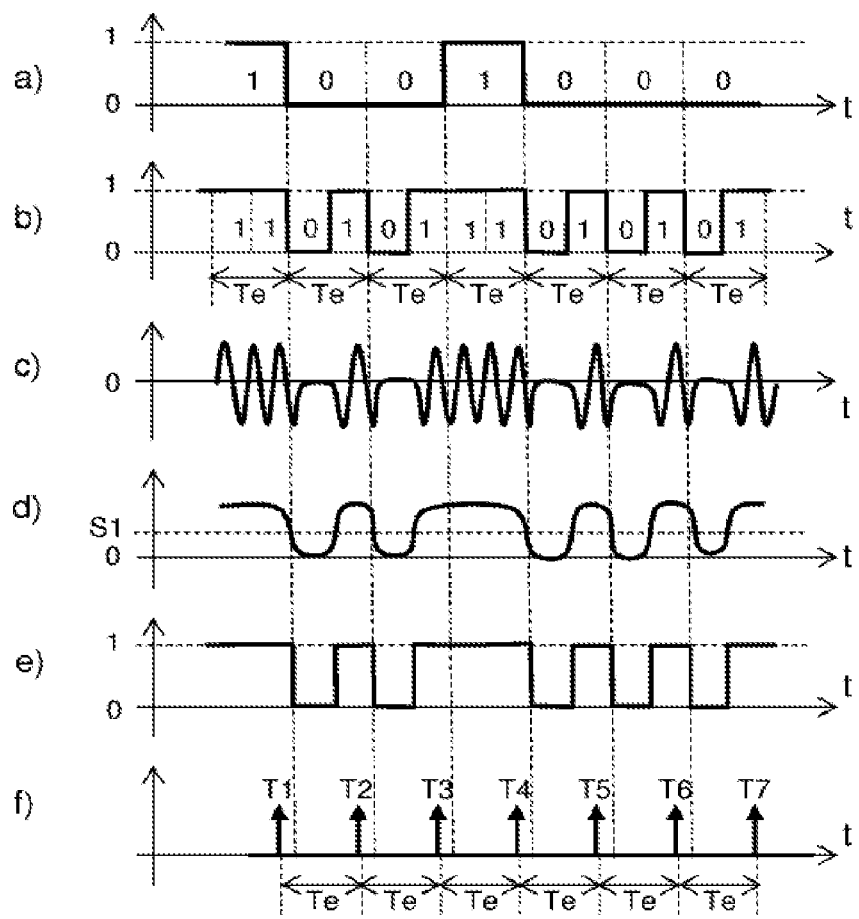
FIG. 6: time-domain diagrams representing the principle of operation of the reception method of FIG. 3, for the case in which the useful signal is an OOK signal.

FIG. 6 represents an example implementation of such an OOK signal transmission method 60.

Part a) in FIG. 6 represents the binary data sequence or "bits" transmitted by the terminal 20, which corresponds to "1 0 0 1 0 0 0".

Part b) in FIG. 6 represents the two-state symbol sequence associated with the binary data sequence represented in part a). In the nonlimiting example illustrated by FIG. 6, when the bit to be transmitted is equal to 1, a symbol of the first state is transmitted, while a symbol of the second state is transmitted when the bit to be transmitted is equal to 0.

Furthermore, the second state is encoded by alternating between the second value and the first value, the cancellation interval being placed at the start of the symbol period Te. In this example, said first value is equal to 1 and the second value is equal to 0. Therefore, the transmitted symbol sequence corresponds to "1 1 0 1 0 1 1 1 0 1 0 1 0 1".

It is to be noted that the cancellation interval can be placed elsewhere rather than at the start of the symbol period Te. In other example implementations, the cancellation interval is placed at the end of the symbol period Te. The cancellation interval can also be surrounded by time intervals over which the second state is encoded by the first value, for example placed substantially at the middle of the symbol period Te.

Part c) in FIG. 6 represents the OOK signal obtained from the symbol sequence represented in part b).

Part d) in FIG. 6 represents the time-domain envelope detected during step 51, from the OOK signal represented in part c).

Part e) in FIG. 6 represents the signal obtained after the thresholding of step 52, from the detected time-domain envelope represented in part d).

Part f) in FIG. 6 represents decision instants T1 to T7. In the example illustrated by part f) in FIG. 6, the decision instants are placed such that, at each decision instant, the detected time-domain envelope is greater than the threshold value S1. For example, each decision instant is placed so as to be substantially at the middle of the second half of a symbol. For such decision instants:

when the detected time-domain envelope becomes less than said threshold value S1 between two consecutive decision instants, a low interval is detected, corresponding to the presence of a symbol of the second state, when the detected time-domain envelope remains greater than said threshold value S1 between two consecutive decision instants, a high interval is detected, corresponding to the presence of a symbol of the first state.

Therefore, the reception method 50, as described with reference notably to FIG. 4, can also be implemented for the reception of OOK signals obtained as described with reference to parts a), b) and c) in FIG. 6, with the exception that:

a detected time-domain envelope that is less than the threshold value S1 between two consecutive decision instants corresponds to the presence of a symbol of the second state and not to a transition between different states, a detected time-domain envelope that remains greater than the threshold value S1 between two consecutive decision instants corresponds to the presence of a symbol of the first state and not to a transition between identical states.

By thus detecting the symbols of the first state and the symbols of the second state, it is understood that the transmitted binary data sequence can be recovered directly. Therefore, the same reception method 50 can be implemented for the reception of such an OOK signal and for the reception of a differentially frequency- or phase-modulated signal, such as a DBPSK signal, since in such a case the transitions between detected different states (low intervals) and the transitions between detected identical states (high intervals) can also be used to directly recover the transmitted binary data sequence.

More generally, it is to be noted that the forms of implementation and embodiments considered above have been described by way of nonlimiting examples, and that other variants can therefore be envisaged.

Notably, the invention has been described by considering the case in which the transmitter device is a terminal 20 and the receiver device is an item of equipment or a combination of items of equipment of the access network 30. However, there is no reason to exclude the possibility, according to other examples, that the transmitter device is an item of equipment or a combination of items of equipment of the access network 30, the receiver device then being a terminal 20.

Moreover, the invention has been described by considering mainly phase modulations, in this case BPSK and DBPSK. However, there is no reason to exclude the possibility, according to other examples, of other phase modulations and frequency modulations, as soon as the transitions between symbols corresponding to different states result in a drop in the amplitude of the useful signal. A GFSK or DGFSK signal, notably, exhibits such drops in amplitude during transitions between symbols corresponding to different states, such that it can be detected in accordance with the invention.

The above description clearly illustrates that through its various characteristics and their advantages, the present invention achieves the objectives that it had set. In particular, the reception method 50 relies mainly on a time-domain envelope detection, which can be performed simply and at low cost. Furthermore, the reception method 50 does not require, in the case notably of a BPSK or DBPSK signal, the generation of a sinusoidal signal that is synchronized in frequency and in phase with the carrier of said BPSK or DBPSK signal.

The invention claimed is:

1. A method for receiving, by a receiver device of a wireless communication system, of a useful signal transmitted by a transmitter device, the method comprising steps of:

detecting a time-domain envelope of the useful signal, the useful signal corresponding to a signal that is phase-modulated or frequency-modulated by a sequence of two-state symbols corresponding to a binary data sequence;

comparing the detected time-domain envelope with a predetermined threshold value;

detecting transitions between consecutive symbols of the useful signal, a transition between two consecutive symbols, respective states of which are different, being detected when the detected time-domain envelope is less than the predetermined threshold value, and a transition between two consecutive symbols, the respective states of which are identical, being detected when the detected time-domain envelope is greater than the predetermined threshold value; and extracting the binary data sequence from the useful signal as a function of detected transitions between different states and as a function of detected transitions between identical states.

2. The reception method as claimed in claim 1, wherein the symbols of a sequence are transmitted at a symbol period; and the reception method further comprises steps of determining decision instants separated by the symbol period; and detecting the transitions between consecutive symbols of the useful signal as a function of the decision instants.

3. The reception method as claimed in claim 2, wherein the decision instants are determined as a function of at least one instant of detection of a transition between different states.

4. The reception method as claimed in claim 2, wherein the decision instants correspond to instants for which the detected time-domain envelope is greater than the predetermined threshold value; wherein the transition between different states is detected when the detected time-domain envelope becomes less than the predetermined threshold value between two consecutive decision instants; and wherein the transition between identical states is detected when the detected time-domain envelope remains greater than the predetermined threshold value between two consecutive decision instants.

5. The reception method as claimed in claim 1, wherein the useful signal is an ultra-narrowband signal.

6. The reception method as claimed in claim 1, wherein the useful signal is a BPSK or DBPSK signal.

7. The reception method as claimed in claim 1, wherein the useful signal is a GFSK or DGFSK signal.

8. The reception method as claimed in claim 1, wherein the time-domain envelope of the useful signal is detected and compared to the predetermined threshold value by the receiver device to receive amplitude-modulated signals.

9. The reception method as claimed in claim 1, wherein the time-domain envelope of the useful signal is detected directly at an output of a low-noise amplifier of the receiver device.

10. A receiver device of a wireless communication system to receive a useful signal transmitted by a transmitter device, the receiver device comprising a processing circuit configured to:

detect a time-domain envelope of the useful signal, the useful signal corresponding to a signal that is phase-modulated or frequency-modulated by a sequence of two-state symbols corresponding to a binary data sequence;

compare the detected time-domain envelope with a predetermined threshold value;

detect transitions between consecutive symbols of the useful signal, a transition between two consecutive symbols, respective states of which are different, is detected when the detected time-domain envelope is less than the predetermined threshold value, and a transition between two consecutive symbols, the respective states of which are identical, is detected when the detected time-domain envelope is greater than the predetermined threshold value; and extract the binary data sequence from the useful signal as a function of detected transitions between different states and as a function of detected transitions between identical states.

11. The receiver device as claimed in claim 10, wherein the processing circuit is configured to carry out time-envelope detection of the useful signal directly at an output of a low-noise amplifier of the receiver device.

12. The receiver device as claimed in claim 10, wherein the processing circuit comprises a processor and a memory.

13. The receiver device as claimed in claim 10, wherein the processing circuit comprises a programmable logic circuit.

\* \* \* \* \*